(12) United States Patent
Zhang et al.

(10) Patent No.: US 10,719,087 B2
(45) Date of Patent: Jul. 21, 2020

(54) TARGET TRACKING METHOD, UNMANNED AERIAL VEHICLE, AND COMPUTER READABLE STORAGE MEDIUM

(71) Applicant: AUTEL ROBOTICS CO., LTD., Shenzhen, Guangdong (CN)

(72) Inventors: Ke Zhang, Guangdong (CN); Bo Zang, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 252 days.

(21) Appl. No.: 15/848,979

(22) Filed: Dec. 20, 2017

(65) Prior Publication Data

US 2019/0064852 A1 Feb. 28, 2019

Related U.S. Application Data

(63) Continuation of application No. PCT/CN2017/108983, filed on Nov. 1, 2017.

(30) Foreign Application Priority Data

Aug. 29, 2017 (CN) .......................... 2017 1 0756805

(51) Int. Cl.
*G05D 1/12* (2006.01)
*B64C 39/02* (2006.01)
(Continued)

(52) U.S. Cl.
CPC .............. *G05D 1/12* (2013.01); *B64C 39/024* (2013.01); *G05D 1/0094* (2013.01); *G05D 1/101* (2013.01);
(Continued)

(58) Field of Classification Search
CPC ........ G05D 1/12; G05D 1/0094; G05D 1/101; G06K 9/3233; G06K 9/0063; G06K 9/62;
(Continued)

(56) References Cited

U.S. PATENT DOCUMENTS

| 2011/0181712 A1 | 7/2011 | You et al. |
| 2012/0307042 A1 | 12/2012 | Lee et al. |
| 2017/0134631 A1 | 5/2017 | Zhao et al. |

FOREIGN PATENT DOCUMENTS

| CN | 101173987 A | 5/2008 |
| CN | 105847684 A | 8/2016 |

(Continued)

OTHER PUBLICATIONS

International Search Report dated May 30, 2018; PCT/CN2017/108983.

(Continued)

*Primary Examiner* — Brian P Sweeney

(57) ABSTRACT

The embodiments of the present invention disclose a target tracking method. The method includes: generating, by the unmanned aerial vehicle, an outer frame according to location information of the at least two targets. At least two targets that need to be tracked are located within the outer frame. The unmanned aerial vehicle adjusts a flight parameter, so that the outer frame falls within a vision angle range of the unmanned aerial vehicle. In this way, multiple targets are converted to a "single target", to find an optimal location for observing all the multiple targets, and it is ensured that the multiple targets are tracked with robustness for maximum duration.

11 Claims, 5 Drawing Sheets

(51) Int. Cl.
*G06K 9/62* (2006.01)
*G06K 9/00* (2006.01)
*G05D 1/10* (2006.01)
*G05D 1/00* (2006.01)
*G06K 9/32* (2006.01)

(52) U.S. Cl.
CPC ......... *G06K 9/0063* (2013.01); *G06K 9/3233* (2013.01); *G06K 9/62* (2013.01); *B64C 2201/127* (2013.01); *B64C 2201/141* (2013.01); *B64C 2201/146* (2013.01); *G06K 2209/21* (2013.01)

(58) Field of Classification Search
CPC .............. G06K 2209/21; B64C 39/024; B64C 2201/141; B64C 2201/146; B64C 2201/127; B64C 2201/14; B64C 2201/123; B64C 2201/12

USPC ........................................................... 701/3
See application file for complete search history.

(56) References Cited

FOREIGN PATENT DOCUMENTS

| CN | 106161953 A | | 11/2016 | |
| CN | 106909172 A | * | 6/2017 | ............... G05D 1/12 |
| CN | 106981073 A | | 7/2017 | |
| WO | 2010/077389 A2 | | 7/2010 | |
| WO | 2017/041303 A1 | | 3/2017 | |

OTHER PUBLICATIONS

Supplementary European Search Report completed Dec. 3, 2018; EP17814293.

* cited by examiner

TARGET TRACKING METHOD, UNMANNED AERIAL VEHICLE, AND COMPUTER READABLE STORAGE MEDIUM

CROSS REFERENCE

This application is a continuation of International Application No. PCT/CN2017/10893, filed on Nov. 1, 2017, which claims priority to Chinese Patent Application No. 201710756805.2, filed on Aug. 29, 2017, both of which are hereby incorporated by reference in their entireties.

TECHNICAL FIELD

The present invention relates to target tracking technologies, and in particular, to a target tracking method, an unmanned aerial vehicle, and a computer readable storage medium.

RELATED ART

Currently, intelligent tracking of an unmanned aerial vehicle (Unmanned Aerial Vehicle. UAV) is limited to a single-target mode. However, as methods such as deep learning and a multisource image fractal characteristic are developed and internal hardware of unmanned aerial vehicles is improved, multi-target tracking of a single unmanned aerial vehicle is also widely studied. According to this idea, multiple targets in a same scenario can be tracked in real time. Therefore, an implementation policy of an intelligent tracking method restricted by a motion status of a target needs to be considered. When multiple initialized targets move at different speeds in different directions, to track the multiple targets, a policy is needed to implement tracking for maximum duration. When a spatial range of the multiple targets is excessively large, and some targets need to be selectively discarded to ensure overall tracking performance, how to select some targets and when to discard the targets is also a problem that needs to be considered.

SUMMARY

Embodiments of the present invention provide a target tracking method, an unmanned aerial vehicle, and a computer readable storage medium, to track multiple targets with robustness.

The embodiments of the present invention provide a target tracking method, including:

determining, by an unmanned aerial vehicle, at least two targets that need to be tracked;

generating, by the unmanned aerial vehicle, an outer frame according to location information of the at least two targets, where the at least two targets are located within the outer frame; and adjusting, by the unmanned aerial vehicle, a flight parameter of the unmanned aerial vehicle, so that the outer frame falls within a vision angle range of the unmanned aerial vehicle.

In an embodiment of the present invention, the method further includes:

receiving, by the unmanned aerial vehicle, information that is entered by a user and that is sent by a controller, where the information that is entered by the user includes information of a target that the user chooses to track.

In an embodiment of the present invention, the determining, by an unmanned aerial vehicle, at least two targets that need to be tracked includes:

determining, by the unmanned aerial vehicle, the target that the user chooses to track as a target that needs to be tracked by the unmanned aerial vehicle, where a quantity of targets that the unmanned aerial vehicle determines to track is less than or equal to a quantity of targets selected by the user.

In an embodiment of the present invention, the determining, by an unmanned aerial vehicle, at least two targets that need to be tracked includes:

receiving, by the unmanned aerial vehicle, a signal sent by each of the at least two targets; and determining, by the unmanned aerial vehicle according to the signal, the at least two targets that need to be tracked.

In an embodiment of the present invention, the method further includes:

determining, by the unmanned aerial vehicle, a minimum vision angle that is needed so that the outer frame falls within a line of sight range of the unmanned aerial vehicle at a current moment; and determining, by the unmanned aerial vehicle, whether the minimum vision angle is greater than a safe vision angle α'; and if yes, increasing, by the unmanned aerial vehicle, a flight height of the unmanned aerial vehicle until the minimum vision angle that is needed so that the outer frame falls within the line of sight range of the unmanned aerial vehicle is less than the safe vision angle α' after the flight height is increased, where:

$\alpha' = \eta \times \alpha_{max}$, $\alpha_{max}$ is a maximum vision angle of the unmanned aerial vehicle, and $\eta$ is a safety coefficient.

In an embodiment of the present invention, the method further includes:

when the unmanned aerial vehicle increases the flight height of the unmanned aerial vehicle, determining whether the at least two targets include a target that cannotcannot be identified by the unmanned aerial vehicle; and if yes, discarding a target according to a target discarding policy, regenerating an outer frame according to location information of remaining targets of the at least two targets, and adjusting the flight parameter of the unmanned aerial vehicle, so that the regenerated outer frame falls within the vision angle range of the unmanned aerial vehicle.

In an embodiment of the present invention, the target discarding policy includes:

determining whether a priority of the target that cannot be identified by the unmanned aerial vehicle is the lowest priority; and if yes, discarding the target that cannot be identified by the unmanned aerial vehicle.

In an embodiment of the present invention, the target discarding policy further includes:

if the priority of the target that cannot be identified by the unmanned aerial vehicle is not the lowest priority, determining whether the priority of the target that cannot be identified by the unmanned aerial vehicle is lower than a priority of a target whose distance from an edge of the outer frame is less than or equal to a preset threshold; and if yes, discarding the target that cannot be identified by the unmanned aerial vehicle.

In an embodiment of the present invention, the target discarding policy further includes:

if the priority of the target that cannot be identified by the unmanned aerial vehicle is not lower than the priority of the target whose distance from the edge of the outer frame is less than or equal to the preset threshold, discarding a target that has the lowest priority and that is of targets whose distances from the edge of the outer frame are less than or equal to the preset threshold.

In an embodiment of the present invention, the target that cannot be identified by the unmanned aerial vehicle is a target whose identification characteristic is less than a critical threshold of an object that can be identified by the unmanned aerial vehicle.

In an embodiment of the present invention, the method further includes:

determining the critical threshold according to at least one of the following:

resolution of a camera installed on the unmanned aerial vehicle, an initialized image size, a target image characteristic matching method, or an image transmission information loss rate.

In an embodiment of the present invention, the method further includes:

determining, by the unmanned aerial vehicle, priorities of the at least two targets.

In an embodiment of the present invention, the method further includes:

receiving, by the unmanned aerial vehicle, information that is entered by a user and that is sent by a controller, where the information that is entered by the user includes information of a target that the user chooses to track; and determining, by the unmanned aerial vehicle, the priorities of the at least two targets according to a sequence in which the user selects targets that need to be tracked.

In an embodiment of the present invention, the adjusting, by the unmanned aerial vehicle, a flight parameter of the unmanned aerial vehicle includes:

adjusting, by the unmanned aerial vehicle, a location and/or a flight height of the unmanned aerial vehicle.

In an embodiment of the present invention, the outer frame always falls within the vision angle range of the unmanned aerial vehicle.

In an embodiment of the present invention, the outer frame is a circle in which the at least two targets are located and that has a minimum radius.

In an embodiment of the present invention, the outer frame is a circumscribed square of a minimum circle, and the minimum circle is a circle in which the at least two targets are located and that has a minimum radius.

In an embodiment of the present invention, a vision angle center of the unmanned aerial vehicle overlaps with the center of the outer frame.

The embodiments of the present invention further provide an unmanned aerial vehicle, including:

an unmanned aerial vehicle body;

an unmanned aerial vehicle arm connected to the unmanned aerial vehicle body;

a power apparatus disposed on the unmanned aerial vehicle arm;

a photographing apparatus, configured to shoot a picture or a video; and a processor in communication connection with the photographing apparatus, where the processor is configured to:

determine the at least two targets that need to be tracked;

generate the outer frame according to the location information of the at least two targets, where the at least two targets are located within the outer frame; and adjust a flight parameter of the unmanned aerial vehicle, so that the outer frame falls within a vision angle range of the unmanned aerial vehicle.

In an embodiment of the present invention, the processor includes a vision processor and a flight control processor;

the vision processor is configured to:

determine the at least two targets that need to be tracked;

generate the outer frame according to the location information of the at least two targets, where the at least two targets are located within the outer frame; and send an instruction used to adjust the flight parameter of the unmanned aerial vehicle to the flight control processor, so that the outer frame falls within the vision angle range of the unmanned aerial vehicle; and the flight control processor is configured to:

receive the instruction and adjust the flight parameter of the unmanned aerial vehicle.

In an embodiment of the present invention, the processor is further configured to:

receive information that is entered by a user and that is sent by a controller, where the information that is entered by the user includes information of a target that the user chooses to track.

In an embodiment of the present invention, the processor is further configured to:

determine the target that the user chooses to track as a target that needs to be tracked by the unmanned aerial vehicle, where a quantity of determined targets that need to be tracked is less than or equal to a quantity of targets selected by the user.

In an embodiment of the present invention, the processor is further configured to:

receive a signal sent by each of the at least two targets; and determine, according to the signal, the at least two targets that need to be tracked.

In an embodiment of the present invention, the processor is further configured to:

determine a minimum vision angle that is needed so that the outer frame falls within a line of sight range of the unmanned aerial vehicle at a current moment; and determine whether the minimum vision angle is greater than a safe vision angle $\alpha'$; and if yes, increasing, by the unmanned aerial vehicle, a flight height of the unmanned aerial vehicle until the minimum vision angle that is needed so that the outer frame falls within the line of sight range of the unmanned aerial vehicle is less than the safe vision angle $\alpha'$ after the flight height is increased, where:

$\alpha' = \eta \times \alpha_{max}$, $\alpha_{max}$ is a maximum vision angle of the unmanned aerial vehicle, and $\eta$ is a safety coefficient.

In an embodiment of the present invention, the processor is further configured to:

when the unmanned aerial vehicle increases the flight height of the unmanned aerial vehicle, determine whether the at least two targets include a target that cannot be identified by the unmanned aerial vehicle; and if yes, discard a target according to a target discarding policy, regenerate an outer frame according to location information of remaining targets of the at least two targets, and adjust the flight parameter of the unmanned aerial vehicle, so that the regenerated outer frame falls within the vision angle range of the unmanned aerial vehicle.

In an embodiment of the present invention, the target discarding policy includes:

determining whether a priority of the target that cannot be identified by the unmanned aerial vehicle is the lowest priority; and if yes, discarding the target that cannot be identified by the unmanned aerial vehicle.

In an embodiment of the present invention, the target discarding policy further includes:

if the priority of the target that cannot be identified by the unmanned aerial vehicle is not the lowest priority, determining whether the priority of the target that cannot be identified by the unmanned aerial vehicle is lower than a priority of a target whose distance from an edge of the outer frame is less than or equal to a preset threshold; and if yes, discarding the target that cannot be identified by the unmanned aerial vehicle.

In an embodiment of the present invention, the target discarding policy further includes:

if the priority of the target that cannot be identified by the unmanned aerial vehicle is not lower than the priority of the target whose distance from the edge of the outer frame is less than or equal to the preset threshold, discarding a target that has the lowest priority and that is of targets whose distances from the edge of the outer frame are less than or equal to the preset threshold.

In an embodiment of the present invention, the target that cannot be identified by the unmanned aerial vehicle is a target whose identification characteristic is less than a critical threshold of an object that can be identified by the unmanned aerial vehicle.

In an embodiment of the present invention, the processor is further configured to:

determine the critical threshold according to at least one of the following:

resolution of a camera installed on the unmanned aerial vehicle, an initialized image size, a target image characteristic matching method, or an image transmission information loss rate.

In an embodiment of the present invention, the processor is further configured to:

determine priorities of the at least two targets.

In an embodiment of the present invention, the processor is further configured to:

receive information that is entered by a user and that is sent by a controller, where the information that is entered by the user includes information of a target that the user chooses to track; and determine the priorities of the at least two targets according to a sequence in which the user selects targets that need to be tracked.

In an embodiment of the present invention, the adjusting, by the unmanned aerial vehicle, a flight parameter of the unmanned aerial vehicle includes:

adjusting, by the unmanned aerial vehicle, a location and/or a flight height of the unmanned aerial vehicle.

In an embodiment of the present invention, the outer frame always falls within the vision angle range of the unmanned aerial vehicle.

In an embodiment of the present invention, the outer frame is a circle in which the at least two targets are located and that has a minimum radius.

In an embodiment of the present invention, the outer frame is a circumscribed square of a minimum circle, and the minimum circle is a circle in which the at least two targets are located and that has a minimum radius.

In an embodiment of the present invention, a vision angle center of the unmanned aerial vehicle overlaps with the center of the outer frame.

The embodiments of the present invention further provide an unmanned aerial vehicle, including a processor and a computer readable storage medium, where the computer readable storage medium stores an instruction, and when the instruction is executed by the processor, the foregoing target tracking method is executed.

The embodiments of the present invention further provide a computer readable storage medium, storing a computer program, where when the computer program is executed by a processor, the foregoing target tracking method is executed.

Compared with the prior art, the embodiments of the present invention include: determining, by an unmanned aerial vehicle, at least two targets that need to be tracked; generating, by the unmanned aerial vehicle, an outer frame according to location information of the at least two targets, where the at least two targets are all located within the outer frame; and adjusting, by the unmanned aerial vehicle, a flight parameter of the unmanned aerial vehicle, so that the outer frame falls within a vision angle range of the unmanned aerial vehicle. According to the solutions of the embodiments of the present invention, the unmanned aerial vehicle generates the outer frame according to the location information of the at least two targets, and the unmanned aerial vehicle adjusts the flight parameter of the unmanned aerial vehicle, so that the outer frame falls within the vision angle range of the unmanned aerial vehicle. In this way, multiple targets are converted to a "single target", to find an optimal location for observing all the multiple targets, and it is ensured that the multiple targets are tracked with robustness for maximum duration.

In an optional solution, when the unmanned aerial vehicle increases the flight height of the unmanned aerial vehicle, the unmanned aerial vehicle determines whether the at least two targets include a target that cannot be identified by the unmanned aerial vehicle; and if yes, discards a target according to a target discarding policy, regenerates an outer frame according to location information of remaining targets of the at least two targets, and adjusts the flight parameter of the unmanned aerial vehicle, so that the regenerated outer frame falls within the vision angle range of the unmanned aerial vehicle. In this way, it is ensured that the unmanned aerial vehicle can always relatively effectively track a target having a relatively high priority.

Other characteristics and advantages of the present invention are described below in the specification, and some characteristics and advantages of the present invention become obvious in the specification, or are known in implementation of the present invention. Objectives and other advantages of the present invention may be implemented and obtained according to structures particularly described in the specification, claims, and accompanying drawings.

BRIEF DESCRIPTION OF THE DRAWINGS

The accompanying drawings are intended to facilitate understanding of the technical solutions of the present invention, and are a part of the specification. The accompanying drawings are used to describe the technical solutions of the present invention together with the embodiments of this application, and constitute no limitation on the technical solutions of the present invention.

DETAILED DESCRIPTION

The following describes the embodiments of the present invention in detail with reference to the accompanying drawings. It should be noted that the embodiments of this application and characteristics of the embodiments may be randomly combined with each other provided that there is no conflict.

Steps shown in flowcharts of the accompanying drawings may be performed, for example, in a computer system of a set of computer executable instructions. In addition, although a logical sequence is shown in a flowchart, the shown or described steps may be performed in a different sequence in some cases.

Figure 1:
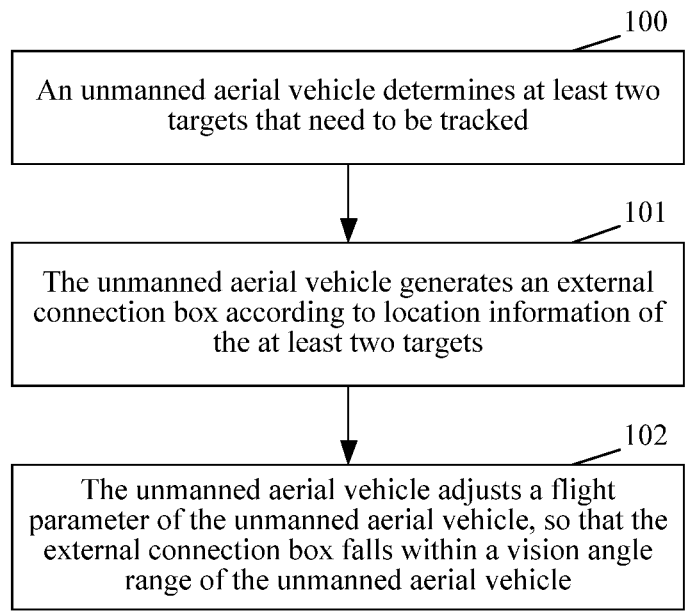
FIG. 1 is a flowchart of an embodiment of a target tracking method according to the present invention.

Referring to FIG. 1, an embodiment of the present invention provides a target tracking method. The method includes:

Step 100: An unmanned aerial vehicle determines at least two targets that need to be tracked.

Figure 2:
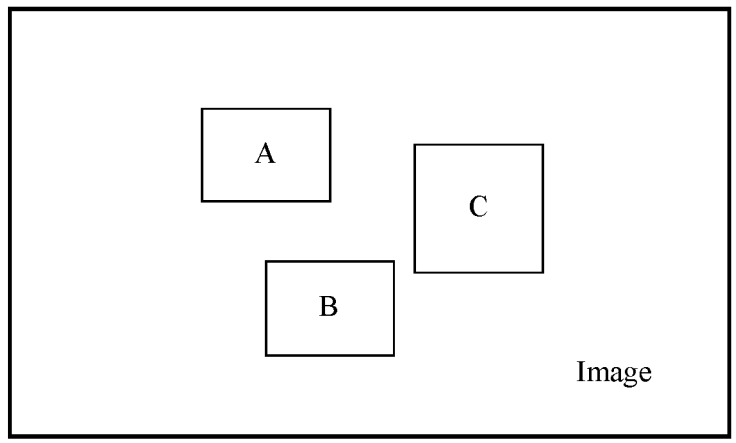
FIG. 2 is a schematic diagram of selecting multiple targets by a user according to the embodiment of the present invention.

The determining, by an unmanned aerial vehicle, at least two targets that need to be tracked may be: determining, by the unmanned aerial vehicle according to selection of a user on a control terminal, the targets that need to be tracked. As shown in FIG. 2, in an embodiment of the present invention, the user selects, by clicking or drawing a box on the control terminal, the at least two targets that need to be tracked, the control terminal sends a target tracking instruction to the unmanned aerial vehicle, and the unmanned aerial vehicle determines, according to the instruction, the at least two targets that need to be tracked.

In an embodiment of the present invention, a quantity of targets that the unmanned aerial vehicle determines to track is less than or equal to a quantity of targets selected by the user.

Alternatively, the determining, by an unmanned aerial vehicle, at least two targets that need to be tracked may be: receiving, by the unmanned aerial vehicle, a tracking signal sent by each of the at least two targets; and determining, by the unmanned aerial vehicle according to the tracking signal, the at least two targets that need to be tracked. In other words, the unmanned aerial vehicle determines a target that sends a tracking signal as a target that needs to be tracked. The tracking signal includes at least location information of the target.

Step 101: The unmanned aerial vehicle generates an outer frame according to location information of the at least two targets, where the at least two targets are located within the outer frame.

The outer frame is an important tool used by the unmanned aerial vehicle to convert multi-target tracking to single-target tracking. The at least two targets that need to be tracked are box-selected in the outer frame, and the outer frame may be generated by the unmanned aerial vehicle, or may be generated by the control terminal after the user clicks or box-selects, on the control terminal, the at least two targets that need to be tracked. When the outer frame is generated by the unmanned aerial vehicle, the outer frame may be visible or invisible to the user on a side of the control terminal.

Location information of a target may be location information of the target in an image coordinate system, or may be latitude and longitude information of the target. The image coordinate system is a coordinate system in an image shot by the unmanned aerial vehicle. Conversion between the location information in the image coordinate system and latitude and longitude information of the target may be performed according to a conversion relationship of the coordinate system. Specifically, coordinate system conversion may be performed by using a technology known by a person skilled in the art, and details are not described herein.

In addition, alternatively, the unmanned aerial vehicle may determine location information of a target by using a target detection method, or determine location information of a target by using another technical means (for example, an intelligent tracking technology) known by a person skilled in the art. Details are not described herein.

Step 102: The unmanned aerial vehicle adjusts a flight parameter of the unmanned aerial vehicle, so that the outer frame falls within a vision angle range of the unmanned aerial vehicle.

After generating the outer frame and box-selecting all targets that need to be tracked, the unmanned aerial vehicle may adjust a location and/or a flight height of the unmanned aerial vehicle, so that the outer frame falls within the vision angle range of the unmanned aerial vehicle, to track the at least two targets.

In an embodiment of the present invention, a vision angle center of the unmanned aerial vehicle always overlaps with the center of the outer frame. When the vision angle center of the unmanned aerial vehicle always overlaps with the center of the outer frame, the unmanned aerial vehicle can be always located in a desirable location for capturing a target.

Figure 3:
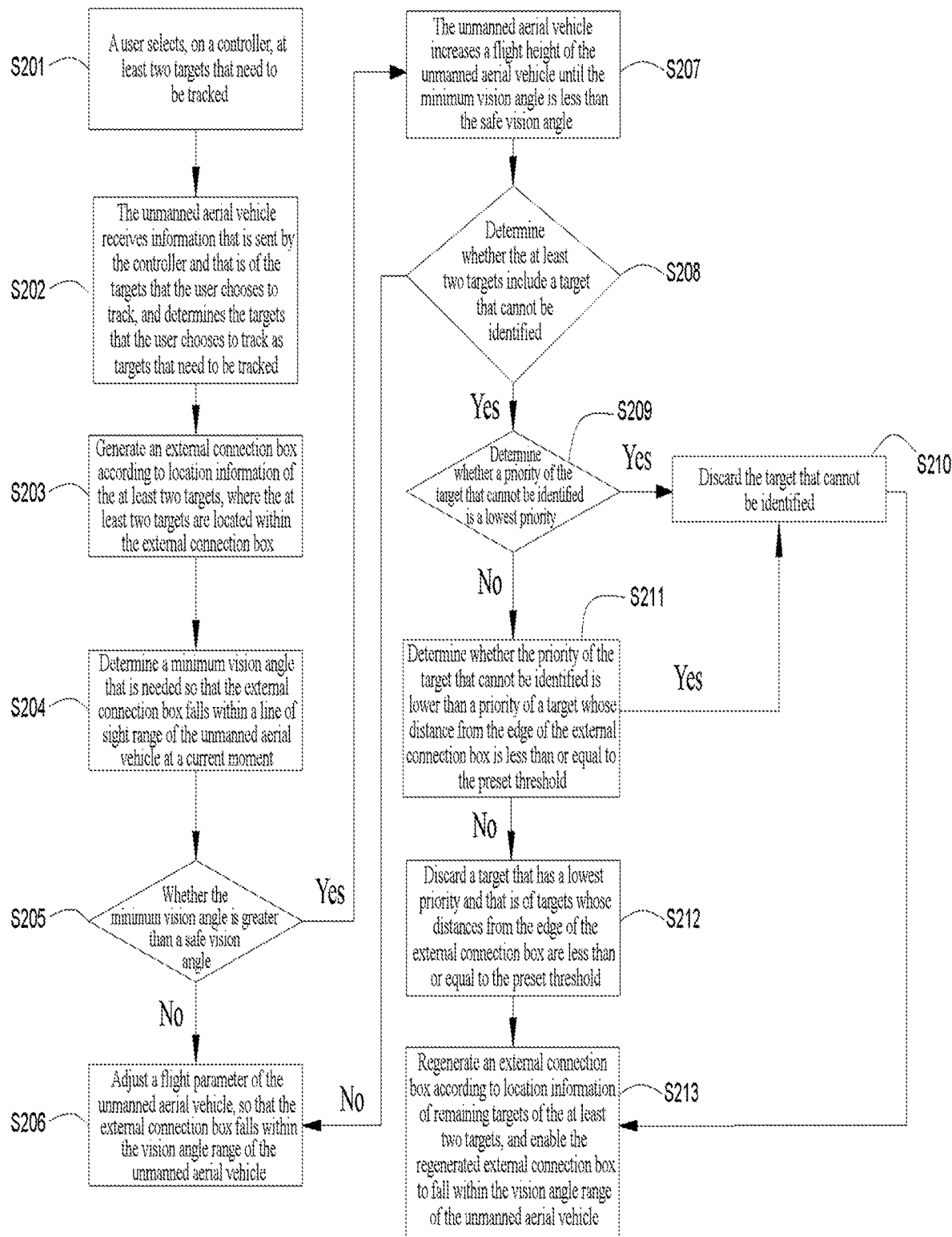
FIG. 3 is a flowchart of another embodiment of a target tracking method according to the present invention.

Referring to FIG. 3, another embodiment of the present invention provides a target tracking method. The method includes:

S201: A user selects, on a controller, at least two targets that need to be tracked.

The user may select a target by clicking or drawing a box. When the user selects a target by clicking, the target selected by the user is displayed by displaying an area whose center is a point clicked by the user. When the user selects a target by drawing a box, the target selected by the user is displayed by displaying the box drawn by the user. As shown in FIG. 2, the user sequentially selects target A, target B, and target C by drawing a box, and the screen of the controller sequentially displays the three boxes drawn by the user.

S202: The unmanned aerial vehicle receives information that is sent by the controller and that is of the targets that the user chooses to track, and determines the targets that the user chooses to track as targets that need to be tracked.

In an embodiment of the present invention, the information of the targets selected by the user includes location information of the selected targets. For example, the information of the targets selected by the user may be location information of the targets selected by the user in an image coordinate system, or may be latitude and longitude information of the targets selected by the user. Location information of a target in an image coordinate system may be coordinates of the target in the image coordinate system for a column number and a row number of the target in an image.

In another possible embodiment, the information of the targets selected by the user may also include information about a sequence in which the targets are selected, and the unmanned aerial vehicle may determine priorities of the at least two targets according to the information about the sequence in which the targets are selected by the user. For example, the controller determines the priorities of the selected targets according to the sequence in which the targets are selected by the user, and sends both a priority of each target and location information of the target to the unmanned aerial vehicle. The controller may determine that a priority of a target first selected by the user is higher than a priority of a target subsequently selected by the user, or determine that a priority of a target first selected by the user is lower than a priority of a target subsequently selected by the user, or determine the priorities of the targets in another manner. This is not limited in the embodiments of the present invention. For example, in FIG. 2, the user sequentially selects target A, target B, and target C, a priority of target A is higher than a priority of target B, and the priority of target B is higher than a priority of target C.

The priorities of the targets may also be obtained by using a policy pre-stored in the unmanned aerial vehicle, and when the priorities of the targets are needed, the unmanned aerial vehicle obtains the priorities of the targets according to the policy.

S203: The unmanned aerial vehicle generates an outer frame according to location information of the at least two targets, where the at least two targets are located within the outer frame. The outer frame is an important tool used by the unmanned aerial vehicle to convert multi-target tracking to single-target tracking. The at least two targets that need to be tracked are box-selected in the outer frame, and the outer frame may be generated by the unmanned aerial vehicle, or may be generated by the control terminal after the user clicks or box-selects, on the control terminal, the at least two targets that need to be tracked. When the outer frame is generated by the unmanned aerial vehicle, the outer frame may be visible or invisible to the user on a side of the control terminal.

Location information of a target may be location information of the target in an image coordinate system, or may be latitude and longitude information of the target. The image coordinate system is a coordinate system in an image shot by the unmanned aerial vehicle. Conversion between the location information in the image coordinate system and latitude and longitude information of the target may be performed according to a conversion relationship of the coordinate system. Specifically, coordinate system conversion may be performed by using a technology known by a person skilled in the art, and details are not described herein.

In addition, alternatively, the unmanned aerial vehicle may determine location information of a target by using a target detection method, or determine location information of a target by using another technical means (for example, an intelligent tracking technology) known by a person skilled in the art. Details are not described herein.

In an embodiment of the present invention, the outer frame is a circle in which the at least two targets are located and that has a minimum radius. The circle that has the minimum radius may be determined by using a minimum circle algorithm as follows:

the unmanned aerial vehicle selects any three targets;

the unmanned aerial vehicle determines, according to location information of the selected three targets, that a minimum circle including the selected three targets is a circumscribed circle of the selected three targets, or a minimum circle including the selected three targets is a circle, where two of the selected three targets are located at two ends of the diameter of the circle, and the remaining target is located inside the circle;

the unmanned aerial vehicle determines whether a target that is farthest from the center of the determined minimum circle and that is of targets other than the selected three targets is located inside the minimum circle or on the circumference of the minimum circle. If the target is located inside the minimum circle or on the circumference of the minimum circle, the minimum circle is the minimum circle that is searched for, and if the target is located outside the minimum circle, continue to perform the step of selecting three new targets.

At least one of the three new targets is not selected previously.

In another possible embodiment, the outer frame including multiple targets may also be a circumscribed square of the determined minimum circle. In addition, the outer frame may be determined in another manner.

As the outer frame including the at least two targets is determined by using a minimum circle algorithm, the unmanned aerial vehicle can obtain an optimal vision angle range, a calculation speed is high, and a resource of the unmanned aerial vehicle is not occupied.

In another embodiment of the present invention, the outer frame is also a circumscribed square of the minimum circle. In addition, the outer frame may be determined in another manner, and this is not limited in the present invention.

S204: The unmanned aerial vehicle determines a minimum vision angle that is needed so that the outer frame falls within a line of sight range of the unmanned aerial vehicle at a current moment.

Figure 4:
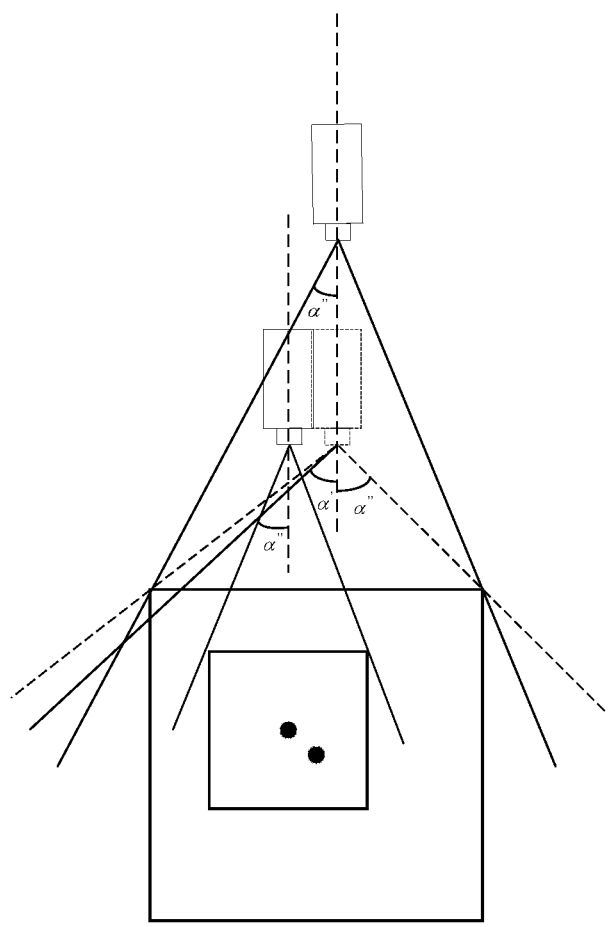
FIG. 4 is a schematic diagram of adjusting a flight parameter of an unmanned aerial vehicle by the unmanned aerial vehicle, so that an outer frame falls within a vision angle range of the unmanned aerial vehicle according to the embodiment of the present invention.

As shown in FIG. 4, the unmanned aerial vehicle may obtain, according to a formula $$\alpha'' = \arctan\frac{L}{H},$$

the minimum vision angle that is needed so that the outer frame falls within the vision angle range of the unmanned aerial vehicle at the current moment.

$\alpha''$ is the minimum vision angle, L is the radius or half the side length of the outer frame, and H is the height of the unmanned aerial vehicle.

S205: The unmanned aerial vehicle determines whether the minimum vision angle $\alpha'$ is greater than a safe vision angle $\alpha'$.

$\alpha' = \eta \times \alpha\_max$, $\alpha\_max$ is the maximum vision angle of the unmanned aerial vehicle, $\eta$ is a safety coefficient, $\eta$ is an empirical value, and $\eta$ may be generally from 0.7 to 0.9.

When the unmanned aerial vehicle tracks multiple targets, there may be a case in which the tracked targets separately move in different directions. When the height of the unmanned aerial vehicle does not change, an imaging size of the outer frame constructed by using the foregoing method becomes increasingly large in an image. As shown in FIG. 4, in this case, a projection location of the unmanned aerial vehicle needs to be adjusted, and in addition, it needs to be ensured that the minimum vision angle $\alpha''$ of the unmanned aerial vehicle is always less than the safe vision angle $\alpha'$.

It is ensured that the minimum vision angle $\alpha'$ is always less than the safe vision angle $\alpha'$, so that the outer frame including multiple targets can always fall within the vision angle range of the unmanned aerial vehicle, multiple targets can fall within the vision angle range of the unmanned aerial vehicle to the highest extent, and target loss can be avoided.

S206: If the minimum vision angle α" is less than or equal to the safe vision angle α', the unmanned aerial vehicle adjusts a flight parameter of the unmanned aerial vehicle, so that the outer frame falls within the vision angle range of the unmanned aerial vehicle. In an embodiment of the present invention, the flight parameter includes a location and/or a flight height of the unmanned aerial vehicle.

The unmanned aerial vehicle may adjust the flight parameter of the unmanned aerial vehicle, so that the determined outer frame falls within the vision angle range of the unmanned aerial vehicle, to track the at least two targets.

S207: If the minimum vision angle α" is greater than the safe vision angle α', the unmanned aerial vehicle needs to increase the flight height of the unmanned aerial vehicle until the minimum vision angle α" is less than or equal to the safe vision angle α'.

S208: The unmanned aerial vehicle determines whether the at least two targets include a target that cannot be identified.

Because factors such as resolution of a camera installed on the unmanned aerial vehicle and image transmission constitute a limitation, when the size of the outer frame gradually increases, the unmanned aerial vehicle cannot constantly resolve a problem of full-target capturing and tracking by increasing the height of the unmanned aerial vehicle. In the embodiments of the present invention, the concept of a critical threshold λ is provided. The critical threshold is related to resolution r of a camera, an initialized image size S, a target image characteristic matching method f, an image transmission information loss rate d, and the like. That is, $\lambda=\lambda(r, s, f, d \ldots)$. The resolution of a camera refers to a description measurement that fineness of details of a bitmap image depends on, and is indicated by a quantity of pixels. The initialized image size refers to a size of a target in an image during initialization, and is generally indicated by a circumscribed rectangular box. The target image characteristic matching method is a method used to find target prospect during tracking. The image transmission information loss rate refers to that actual image information losses by a particular percentage because of interference during image transmission.

The critical threshold may be provided according to experience. An identification characteristic that depends on the critical threshold and that is of a target in an image cannot be less than a critical threshold of an object that the unmanned aerial vehicle can identify, and if the identification characteristic is less than the critical threshold, the unmanned aerial vehicle determines the target as a target that cannot be identified.

For example, it is assumed that resolution of a camera installed on the unmanned aerial vehicle is 1280×720, an initialized target size is 200×100, and an average image transmission information loss rate is 10%. To ensure target tracking precision and robustness, assuming that a current quantity of pixels that describes a target characteristic and that depends on the critical threshold cannot be less than 2000, a minimum imaging size of a target is 64×34. Once the size of the target in a target group is less than 64×34, the unmanned aerial vehicle starts a target discarding policy.

Figure 5:
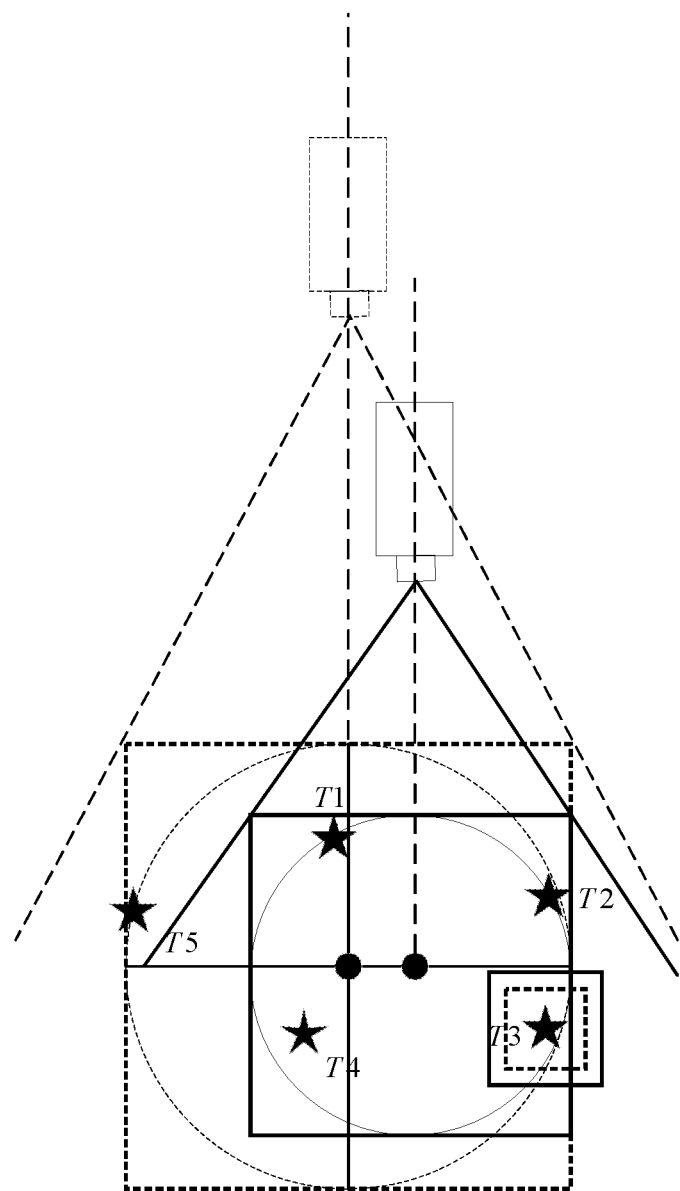
FIG. 5 is a simple principle diagram of a target discarding policy according to the present invention.

The target discarding policy may be: as shown in FIG. 5, when an identification characteristic of target T3 is less than the critical threshold, target T5 whose distance from the edge of the outer frame is less than or equal to a preset threshold and that has a minimum priority is deleted, and an outer frame is determined again, to ensure that the unmanned aerial vehicle can always relatively effectively track a target having a relatively high priority.

A new outer frame of remaining targets is obtained by using the target discarding policy, to better obtain characteristics of the remaining targets, to ensure that the unmanned aerial vehicle can always relatively effectively track a target having a relatively high priority.

In an embodiment of the present invention, the target discarding policy includes:

S209: The unmanned aerial vehicle determines whether a priority of the target that cannot be identified is a lowest priority. The priority of the target may be obtained according to the method in S202.

If yes, the unmanned aerial vehicle performs step S210, that is, the unmanned aerial vehicle discards the target that cannot be identified and performs S213.

If not, the unmanned aerial vehicle performs step S211, that is, the unmanned aerial vehicle further determines whether the priority of the target that cannot be identified is lower than a priority of a target whose distance from the edge of the outer frame is less than or equal to the preset threshold.

If yes, the unmanned aerial vehicle performs step S210, to discard the target that cannot be identified, and performs step S213.

If not, perform step S212, that is, the unmanned aerial vehicle chooses to discard a target that has a lowest priority and that is of targets whose distances from the edge of the outer frame are less than or equal to the preset threshold, and perform step S213.

S213: The unmanned aerial vehicle regenerates an outer frame according to location information of remaining targets of the at least two targets, and enables the regenerated outer frame to fall within the vision angle range of the unmanned aerial vehicle.

In an embodiment of the present invention, a vision angle center of the unmanned aerial vehicle always overlaps with the center of the outer frame. When the vision angle center of the unmanned aerial vehicle always overlaps with the center of the outer frame, the unmanned aerial vehicle can be always located in a desirable location for capturing a target.

Figure 6:
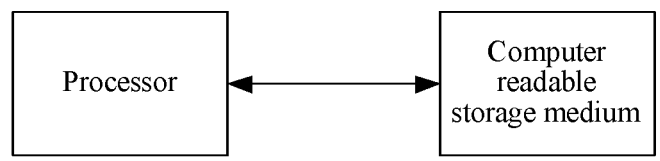
FIG. 6 is a schematic structural diagram of an unmanned aerial vehicle according to an embodiment of the present invention.

Referring to FIG. 6, the embodiments of the present invention further provide an unmanned aerial vehicle, including a processor and a computer readable storage medium, where the computer readable storage medium stores an instruction, and when the instruction is executed by the processor, any one of the foregoing target tracking methods is executed.

The embodiments of the present invention further provide a computer readable storage medium, storing a computer program, where when the computer program is executed by a processor, steps of any one of the foregoing target tracking methods is executed.

Figure 7:
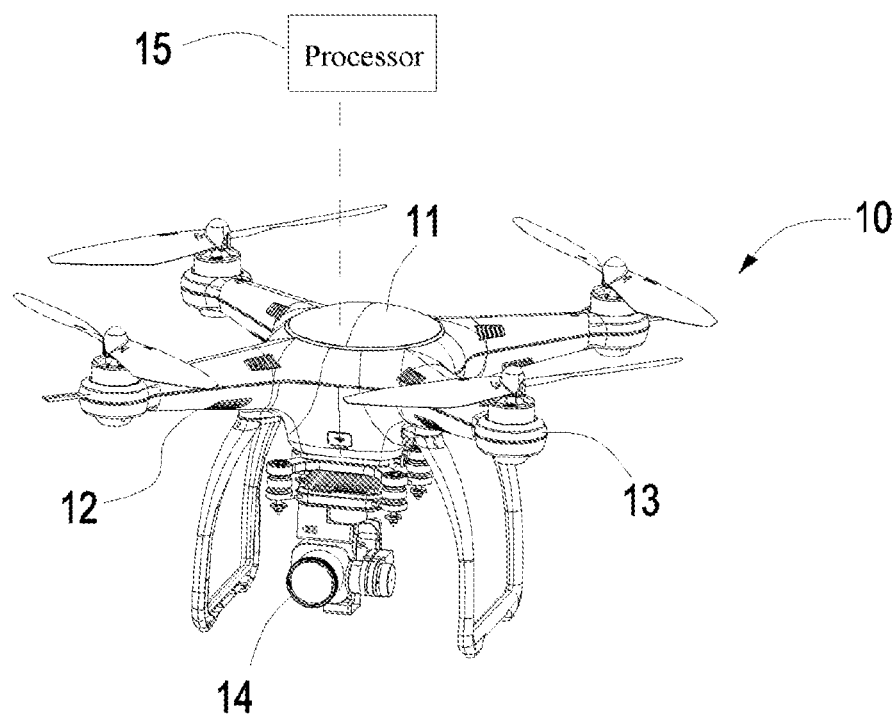
FIG. 7 is a schematic structural diagram of an unmanned aerial vehicle according to another embodiment of the present invention.

Referring to FIG. 7, the embodiments of the present invention further provide an unmanned aerial vehicle 10. The unmanned aerial vehicle 10 includes an unmanned aerial vehicle body 11, an unmanned aerial vehicle arm 12 connected to the unmanned aerial vehicle body 11, a power apparatus 13 disposed on the unmanned aerial vehicle arm 12, a photographing apparatus 14 connected to the unmanned aerial vehicle body 11, and a processor 15 that is disposed in the unmanned aerial vehicle body 11 and that is in communication connection with the photographing apparatus 14.

In this embodiment, the unmanned aerial vehicle 10 includes four unmanned aerial vehicle arms 12. That is, in this embodiment, the unmanned aerial vehicle is a four-rotor unmanned aerial vehicle. In another possible embodiment, the unmanned aerial vehicle may also be a six-rotor unmanned aerial vehicle (six unmanned aerial vehicle arms) or an eight-rotor unmanned aerial vehicle (eight unmanned aerial vehicle arms). The power apparatus 13 usually includes a rotor disposed at the end of the unmanned aerial vehicle arm 12 and a propeller connected to a shaft of the rotor. The rotor drives the propeller to rotate to provide a lift force for the unmanned aerial vehicle 10. The photographing apparatus 14 is an on-board camera, and is configured to shoot a picture or a video.

In an embodiment of the present invention, the processor includes a vision processor and a flight control processor;

the vision processor is configured to:

determine the at least two targets that need to be tracked;

generate the outer frame according to the location information of the at least two targets, where the at least two targets are located within the outer frame; and send an instruction used to adjust the flight parameter of the unmanned aerial vehicle to the flight control processor, so that the outer frame falls within the vision angle range of the unmanned aerial vehicle; and the flight control processor is configured to receive the instruction sent by the vision processor, adjust the flight parameter of the unmanned aerial vehicle, and execute the foregoing target tracking method.

Figure 8:
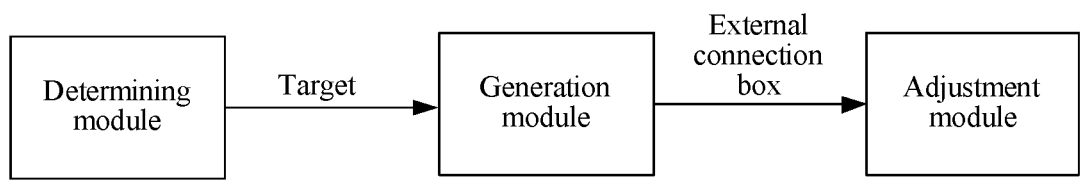
FIG. 8 is a simple structural diagram of a target tracking apparatus according to an embodiment of the present invention.

Referring to FIG. 8, an embodiment of the present invention further provides a target tracking apparatus, including:

a determining module, configured to determine the at least two targets that need to be tracked;

a generation module, configured to generate the outer frame according to the location information of the at least two targets, where the at least two targets are located within the outer frame or on the outer frame; and an adjustment module, configured to adjust the flight parameter of the unmanned aerial vehicle, so that the outer frame falls within the vision angle range of the unmanned aerial vehicle.

Optionally, the determining module is specifically configured to:

determine the target selected the user as a target that needs to be tracked by the unmanned aerial vehicle, where a quantity of targets that the unmanned aerial vehicle determines to track is less than or equal to a quantity of targets selected by the user.

Optionally, the determining module is specifically configured to:

receive a signal sent by each of the at least two targets; and determine, according to the signal, the at least two targets that need to be tracked.

Optionally, the adjustment module is further configured to:

determine a minimum vision angle that is needed so that the outer frame falls within a line of sight range of the unmanned aerial vehicle at a current moment; and determine whether the minimum vision angle is greater than a safe vision angle $\alpha'$; and if yes, increasing, by the unmanned aerial vehicle, a flight height of the unmanned aerial vehicle until the minimum vision angle that is needed so that the outer frame falls within the line of sight range of the unmanned aerial vehicle is less than the safe vision angle $\alpha'$ after the flight height is increased, where:

$a'=\eta \times \alpha_{max}$, $\alpha_{max}$ is a maximum vision angle of the unmanned aerial vehicle, and $\eta$ is a safety coefficient.

Optionally, the generation module is further configured to determine priorities of the at least two targets.

The adjustment module is further configured to:

when the unmanned aerial vehicle increases the flight height of the unmanned aerial vehicle, determine whether the at least two targets include a target that cannot be identified by the unmanned aerial vehicle; and if yes, discard a target according to a target discarding policy, regenerate an outer frame according to location information of remaining targets of the at least two targets, and adjust the flight parameter of the unmanned aerial vehicle, so that the regenerated outer frame falls within the vision angle range of the unmanned aerial vehicle.

Optionally, the adjustment module is specifically configured to implement the target discarding policy in the following manner:

determining whether a priority of the target that cannot be identified by the unmanned aerial vehicle is the lowest priority; and if yes, discarding the target that cannot be identified by the unmanned aerial vehicle;

if the priority of the target that cannot be identified by the unmanned aerial vehicle is not the lowest priority, determining whether the priority of the target that cannot be identified by the unmanned aerial vehicle is lower than a priority of a target whose distance from an edge of the outer frame is less than or equal to a preset threshold; and if yes, discarding the target that cannot be identified by the unmanned aerial vehicle; and if the priority of the target that cannot be identified by the unmanned aerial vehicle is not lower than the priority of the target whose distance from the edge of the outer frame is less than or equal to the preset threshold, discarding a target that has the lowest priority and that is of targets whose distances from the edge of the outer frame are less than or equal to the preset threshold. In the embodiments of the present invention, the determining module, the generation module, and the adjustment module may be disposed in a flight control chip or a processor in the unmanned aerial vehicle.

Although implementations of the present invention are disclosed above, the foregoing content is only intended to facilitate understanding of implementations used in the present invention, instead of limiting the present invention. Any person skilled in the art of the present invention may make any change or modification to forms or details of implementations without departing from the spirit and scope disclosed in the present invention, but the patent protection scope of the present invention still needs to be subject to the appended claims.

The invention claimed is:

1. A target tracking method, comprising:

determining, by a first processor in an unmanned aerial vehicle, at least two targets that need to be tracked;

generating, by the first processor in the unmanned aerial vehicle, an outer frame according to location information of the at least two targets, wherein the at least two targets are located within the outer frame; and adjusting, by a second processor in the unmanned aerial vehicle, a flight parameter of the unmanned aerial vehicle, so that the outer frame falls within a vision angle range of the unmanned aerial vehicle; wherein the first processor and the second processor are the same processor or different processors in the unmanned aerial vehicle;

wherein the method further comprises:

determining, by the unmanned aerial vehicle, a minimum vision angle that is needed so that the outer frame falls within a line of sight range of the unmanned aerial vehicle at a current moment; and determining, by the unmanned aerial vehicle, whether the minimum vision angle is greater than a safe vision angle α'; and if yes, increasing, by the unmanned aerial vehicle, a flight height of the unmanned aerial vehicle until the minimum vision angle that is needed so that the outer frame falls within line of sight range of the unmanned aerial vehicle is less than the safe vision angle α' after the flight height is increased, wherein: α'=η×$α_{max}$, $α_{max}$ is a maximum vision angle of the unmanned aerial vehicle, and η is a safety coefficient.

2. The target tracking method according to claim 1 wherein the method further comprises:

when the unmanned aerial vehicle increases the flight height of the unmanned aerial vehicle, determining whether the at least two targets comprise a target that cannot be identified by the unmanned aerial vehicle; and if yes, discarding a target according to a target discarding policy, regenerating an outer frame according to location information of remaining targets of the at least two targets, and adjusting the flight parameter of the unmanned aerial vehicle, so that the regenerated outer frame falls within the vision angle range of the unmanned aerial vehicle.

3. The target tracking method according to claim 2, wherein the target discarding policy comprises:

determining whether a priority of the target that cannot be identified by the unmanned aerial vehicle is the lowest priority; and if yes, discarding the target that cannot be identified by the unmanned aerial vehicle.

4. The target tracking method according to claim 3, wherein the target discarding policy further comprises:

if the priority of the target that cannot be identified by the unmanned aerial vehicle is not the lowest priority, determining whether the priority of the target that cannot be identified by the unmanned aerial vehicle is lower than a priority of a target whose distance from an edge of the outer frame is less than or equal to a preset threshold; and if yes, discarding the target that cannot be identified by the unmanned aerial vehicle.

5. The target tracking method according to claim 4, wherein the target discarding policy further comprises:

if the priority of the target that cannot be identified by the unmanned aerial vehicle is not lower than the priority of the target whose distance from the edge of the outer frame is less than or equal to the preset threshold, discarding a target that has the lowest priority and that is of targets whose distances from the edge of the outer frame are less than or equal to the preset threshold.

6. The target tracking method according to claim 3, wherein the target that cannot be identified by the unmanned aerial vehicle is a target whose identification characteristic is less than a critical threshold of an object that can be identified by the unmanned aerial vehicle.

7. The target tracking method according to claim 6, wherein the method further comprises:

determining the critical threshold according to at least one of the following:

resolution of a camera installed on the unmanned aerial vehicle, an initialized image size, a target image characteristic matching method, or an image transmission information loss rate.

8. The target tracking method according to claim 3, wherein the method further comprises:

determining, by the unmanned aerial vehicle, priorities of the at least two targets.

9. The target tracking method according to claim 3, wherein the method further comprises:

receiving, by the unmanned aerial vehicle, information that is entered by a user and that is sent by a controller, wherein the information that is entered by the user comprises information of a target that the user chooses to track; and determining, by the unmanned aerial vehicle, the priorities of the at least two targets according to a sequence in which the user selects targets that need to be tracked.

10. The target tracking method according to claim 1, wherein the outer frame is a circle in which the at least two targets are located and that has a minimum radius.

11. The target tracking method according to claim 1, wherein the outer frame is a circumscribed square of a minimum circle, and the minimum circle is a circle in which the at least two targets are located and that has a minimum radius.

* * * * *